United States Patent
Parameswaran

(10) Patent No.: US 7,127,542 B2
(45) Date of Patent: Oct. 24, 2006

(54) HOT-PLUGGING NODES IN A MODULAR SYSTEM HAVING REDUNDANT POWER SUPPLIES

(75) Inventor: Santha Kumar Parameswaran, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 123 days.

(21) Appl. No.: 10/286,295

(22) Filed: Nov. 2, 2002

(65) Prior Publication Data
US 2004/0088464 A1 May 6, 2004

(51) Int. Cl.
*G06F 13/00* (2006.01)
*G06F 1/26* (2006.01)

(52) U.S. Cl. ..................... 710/302; 713/300
(58) Field of Classification Search ........... 710/300, 710/302; 713/300
See application file for complete search history.

(56) References Cited

U.S. PATENT DOCUMENTS

| | | | |
|---|---|---|---|
| 4,607,330 A | 8/1986 | McMurray et al. ......... 364/200 |
| 4,644,440 A | 2/1987 | Kenny et al. .............. 361/111 |
| 5,359,180 A | 10/1994 | Park et al. ............. 219/121.54 |
| 5,603,044 A | 2/1997 | Annapareddy et al. ..... 395/800 |
| 5,668,417 A | 9/1997 | Wiscombe et al. .......... 307/64 |
| 5,672,958 A | 9/1997 | Brown et al. ............. 323/269 |
| 5,811,889 A | 9/1998 | Massie .................... 307/44 |
| 5,845,150 A | 12/1998 | Henion .................... 395/839 |
| 5,909,583 A * | 6/1999 | Hayes et al. .............. 713/300 |
| 5,946,495 A | 8/1999 | Scholhamer et al. ... 395/750.01 |
| 6,014,319 A | 1/2000 | Kuchta et al. ............ 361/788 |
| 6,127,879 A | 10/2000 | Willis et al. ............. 327/408 |
| 6,170,028 B1 * | 1/2001 | Wallach et al. ........... 710/302 |
| 6,286,066 B1 * | 9/2001 | Hayes et al. ............. 710/302 |
| 6,301,133 B1 | 10/2001 | Cuadra et al. ............. 363/65 |
| 6,339,329 B1 * | 1/2002 | Neumann et al. ......... 324/252 |
| 6,396,391 B1 * | 5/2002 | Binder ................ 340/310.01 |
| 6,401,157 B1 * | 6/2002 | Nguyen et al. ........... 710/302 |

(Continued)

OTHER PUBLICATIONS

Dallas Semiconductor, Selecting the Right CMOS Analog, Switch, Oct. 2000, application note 638.*

(Continued)

*Primary Examiner*—Mark H. Rinehart
*Assistant Examiner*—Christopher Daley
(74) *Attorney, Agent, or Firm*—Baker Botts L.L.P.

(57) ABSTRACT

Substantial reduction or total elimination of switching transients (glitches) in an information handling system caused by inserting and/or removing hot-pluggable nodes having large power requirements is achieved with a plurality of power supplies having spare power capacity and being configurable into a main power source and an isolated power source. When insertion of a new hot-pluggable node is detected, this newly inserted node is powered from the isolated power source that is not coupled to the other existing operational nodes. When power to the new hot-pluggable node has stabilized and no longer has any detectable transients thereon, the new node is coupled to the main power source which powers the existing nodes of the information handling system. The isolated power source may thereafter be coupled to the main power source for added power supply redundancy. The new node may be detected and made part of or removed from the information handling system without being coupled to the main power source. When an operating node to be removed is detected, all processes to that node are stopped, and the node to be removed is coupled to the isolated power source. After removal of the node, the isolated power source may thereafter be coupled to the main power source for added power supply redundancy.

24 Claims, 6 Drawing Sheets

U.S. PATENT DOCUMENTS 6,418,492 B1 * 7/2002 Papa et al. .................. 710/302
6,449,676 B1 * 9/2002 Johari et al. ................ 710/304
6,490,277 B1   12/2002 Tzotzkov .................... 370/360
6,591,324 B1 * 7/2003 Chen et al. ................. 710/302
6,816,936 B1 * 11/2004 Wu et al. ................... 710/302
2004/0001303 A1 * 1/2004 Doblar et al. ............... 361/601

OTHER PUBLICATIONS

Dallas Semiconductor, Improved, SPST/SPDT Analog Switches, Sep. 1995.*

* cited by examiner

HOT-PLUGGING NODES IN A MODULAR SYSTEM HAVING REDUNDANT POWER SUPPLIES

BACKGROUND OF THE INVENTION TECHNOLOGY

1. Field of the Invention

The present application is related to information handling systems, and more specifically, to information handling systems having modular hot-pluggable electronic nodes and redundant power supplies.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Mission critical information handling systems such as computer servers and associated storage disk arrays require availability twenty-four hours a day, seven days a week (24/7), without having to be shut down for maintenance, upgrading, or expansion. With high availability in mind, these information handling systems are being designed with modular subsystems, or "nodes," that may be installed and removed without turning system power off or shutting down operation thereof (hereinafter, "hot-pluggable" or "hot-plugging"). Early examples of hot-pluggable modules (nodes) are input-output cards, modems, network interface cards, disk storage units and the like. More recently, hot-pluggable processing modules such as multiple central processing units (CPUs) with or without associate cache, Redundant Array of Independent Disks (RAID) disk storage, random access memory (RAM), system expansion chassis and the like are being designed for upgrading and/or expanding the information handling systems without interrupting operation thereof. New operating systems are also being developed to take advantage of these more complex hot-pluggable nodes for information handling system upgrades, expansion and maintenance.

To realize the aforementioned benefit and potential of using hot-pluggable nodes in the information handling system, noise free power must be maintained during insertion and removal thereof. Hot-pluggable nodes such as Network Interface Cards (NICs), modems, I/O ports and the like, have limited power requirements and do not impose a large load change on the information handling system power supply. However, the newer hot-pluggable multi-processor nodes, memory nodes, disk array nodes and the like, require a great deal of power from the information handling system power supply. These high power demand hot-pluggable nodes can create switching transients on the common power bus when inserted or removed from the information handling system. The power bus is also connected to other on-line nodes, and these switching transients, if not suppressed or eliminated, may cause catastrophic glitches to other operating nodes that ultimately will cause system crashes.

Prior methods of controlling switching transients when a hot-pluggable node is inserted or removed are: ramping-up voltage gradually to the newly connected node, or breaking the ground connection before power is disconnected from the hot-pluggable node. Either of these methods worked when the node did not require a lot of power. However, the multi-processor, memory, disk array and the like nodes require orders of magnitude more current (power) than the previous less complex hot-pluggable nodes.

Therefore, a problem exists, and a solution is required for inserting or removing hot-pluggable nodes having large power requirements without creating switching transients that could disrupt operation of a mission critical, high availability information handling system. The present invention is a response to the need for accommodating hot-pluggable nodes having large power requirements without disrupting other operating nodes in the information handling system.

SUMMARY OF THE INVENTION

The present invention remedies the shortcomings of the prior art by providing an apparatus, system, and method for substantially reducing or totally eliminating switching transients (glitches) caused by insertion and/or removal of hot-pluggable nodes having large power requirements.

In the present invention, an information handling system has a plurality of power supplies, of which one or more are redundant to the power requirement needs of the system. Upon detecting insertion of a new hot-pluggable node, one of the plurality of power supplies is isolated from the remaining plurality of power supplies by connecting it to an isolated power distribution bus. This isolated power distribution bus is then coupled to the newly inserted hot-pluggable node. Once all voltages from the isolated power supply to the newly inserted hot-pluggable node have stabilized, the new node may be connected to the same main power distribution bus as the other existing nodes and power supplies without causing any switching transients. The basic input-output system (BIOS) or operating system (OS) can start the software routines for adding the new node to the system, or power-up the system, depending upon the situation and/or application required. The isolated power supply may also be reconnected to the main power distribution bus that is coupled to the other existing nodes and other pluralities of power supplies.

Connection and disconnection to and from the isolated and main power distribution buses may be performed with "make-before-break" switches comprising, for example, but not limited to, power transistors, power field effect transistors, and the like. Voltage levels and switching transients may be detected by, for example, but not limited to, a high gain and fast response voltage comparator that compares the voltage(s) of the main power distribution bus to those of the isolated power distribution bus connected to the newly inserted hot-pluggable node. Once there is substantially no voltage differences (DC or AC) between the main power distribution bus and the isolated power distribution bus, the new node and isolated power supply are ready to be connected to the same main power distribution bus as the other existing operational nodes and power supplies. The isolated power supply now functions as the redundant power source.

A technical advantage of the present invention is substantial reduction or elimination of noise transients and/or voltage sag or surge on a main power source when a new load is hot-plugged into an information handling system. Another technical advantage is integrating a new subsystem without disturbing existing operating subsystems.

BRIEF DESCRIPTION OF THE DRAWINGS

A more complete understanding of the present disclosure and advantages thereof may be acquired by referring to the following description taken in conjunction with the accompanying drawings wherein.

Figure 1:
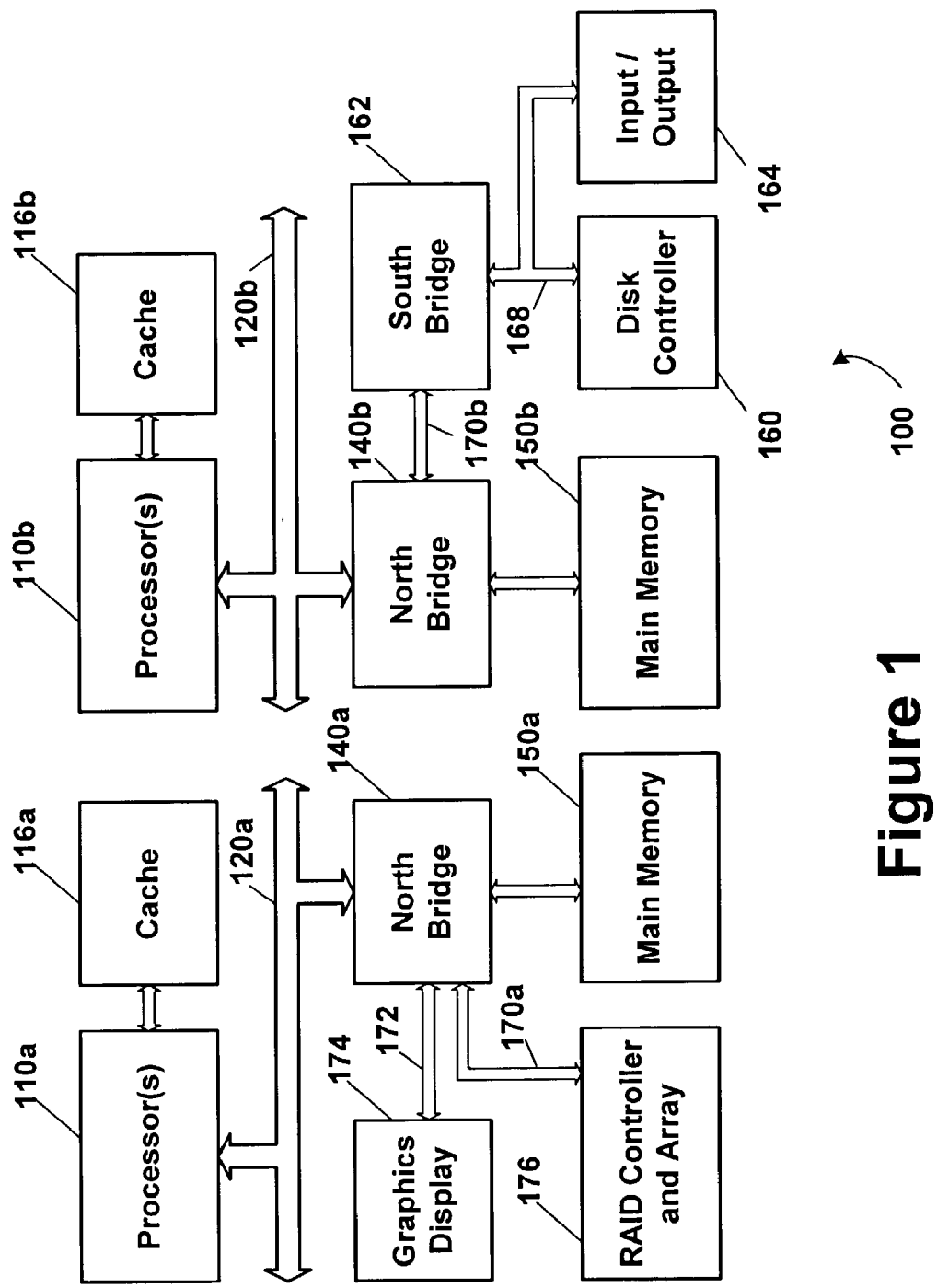
FIG. 1 is a schematic block diagram of an exemplary embodiment of an information handling system.

The present invention may be susceptible to various modifications and alternative forms. Specific exemplary embodiments thereof are shown by way of example in the drawing and are described herein in detail. It should be understood, however, that the description set forth herein of specific embodiments is not intended to limit the present invention to the particular forms disclosed. Rather, all modifications, alternatives, and equivalents falling within the spirit and scope of the invention as defined by the appended claims are intended to be covered.

DETAILED DESCRIPTION OF SPECIFIC EMBODIMENTS

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU), hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to the drawings, the details of exemplary embodiments of the present invention are schematically illustrated. Like elements in the drawings will be represented by like numbers, and similar elements will be represented by like numbers with a different lower case letter suffix.

Referring to FIG. 1, an information handling system is illustrated having hot-pluggable subsystems or "nodes." In one embodiment, the information handling system is a computer system. The information handling system, generally referenced by the numeral 100, comprises a processor(s) 110 coupled to a host bus(es) 120 and a cache memory 116. A north bridge(s) 140, which may also be referred to as a "memory controller hub" or a "memory controller," is coupled to a main system memory 150. The north bridge 140 is coupled to the system processor(s) 110 via the host bus(es) 120. The north bridge 140 is generally considered an application specific chip set that provides connectivity to various buses, and integrates other system functions such as memory interface. For example, an Intel 820E and/or 815E chip set, available from the Intel Corporation of Santa Clara, Calif., provides at least a portion of the north bridge 140. The chip set may also be packaged as an application specific integrated circuit ("ASIC"). The north bridge 140 typically includes functionality to couple the main system memory 150 to other devices within the information handling system 100. Thus, memory controller functions such as main memory control functions typically reside in the north bridge 140. In addition, the north bridge 140 provides bus control to handle transfers between the host bus 120 and a second bus, e.g., PCI bus 170, AGP bus 172 (coupled to graphics display 174), etc. The second bus may also include other industry standard buses or proprietary buses, e.g., ISA, SCSI, USB buses 168 through a south bridge (bus interface) 162. These secondary buses 168 may have their own interfaces and controllers, e.g., ATA disk controller 160 and input/output interface(s) 164.

In the information handling system 100, according to the present invention, any of the aforementioned functional subsystems or "nodes" can be replaced or be added without shutting down the information handling system 100. For example, disk controller 160, processors 110, main memory 150, network interface controllers (NIC) (not shown), disk storage arrays 176, and the like. The ability to replace and/or add functional subsystems (nodes) to the information handling system 100 without requiring the system to power-down, greatly facilitates the desired 24/7 operation. The present invention furthers the reliability and operational integrity of the 24/7 information handling system 100 by substantially reducing or eliminating power supply noise glitches and other disruptive power supply noise when "hot-plugging" nodes that could cause errors and even malfunctions of other existing and operating nodes.

The present invention is a system, method and apparatus, in an information handling system 100, for substantially reducing or totally eliminating switching transients (glitches) caused by insertion and/or removal of hot-pluggable nodes having large power requirements. According to the present invention, a plurality of power supplies having spare power capacity are coupled to a plurality of subsystems or nodes comprising the information handling system 100. When insertion of a new hot-pluggable node is detected, this newly inserted node is powered from an isolated power source de-coupled from the other existing operational nodes and power supplies. When power to the new hot-pluggable node has stabilized and no longer has any detectable transients thereon, the new node is coupled to the main power source which powers the existing nodes of the information handling system 100. In addition, the isolated power source may thereafter be coupled to the main power source for added redundancy. In addition, the new node may be detected and made part of the information handling system by the basic input-output system (BIOS) or operating system (OS) before being coupled to the main power source.

Figure 2:
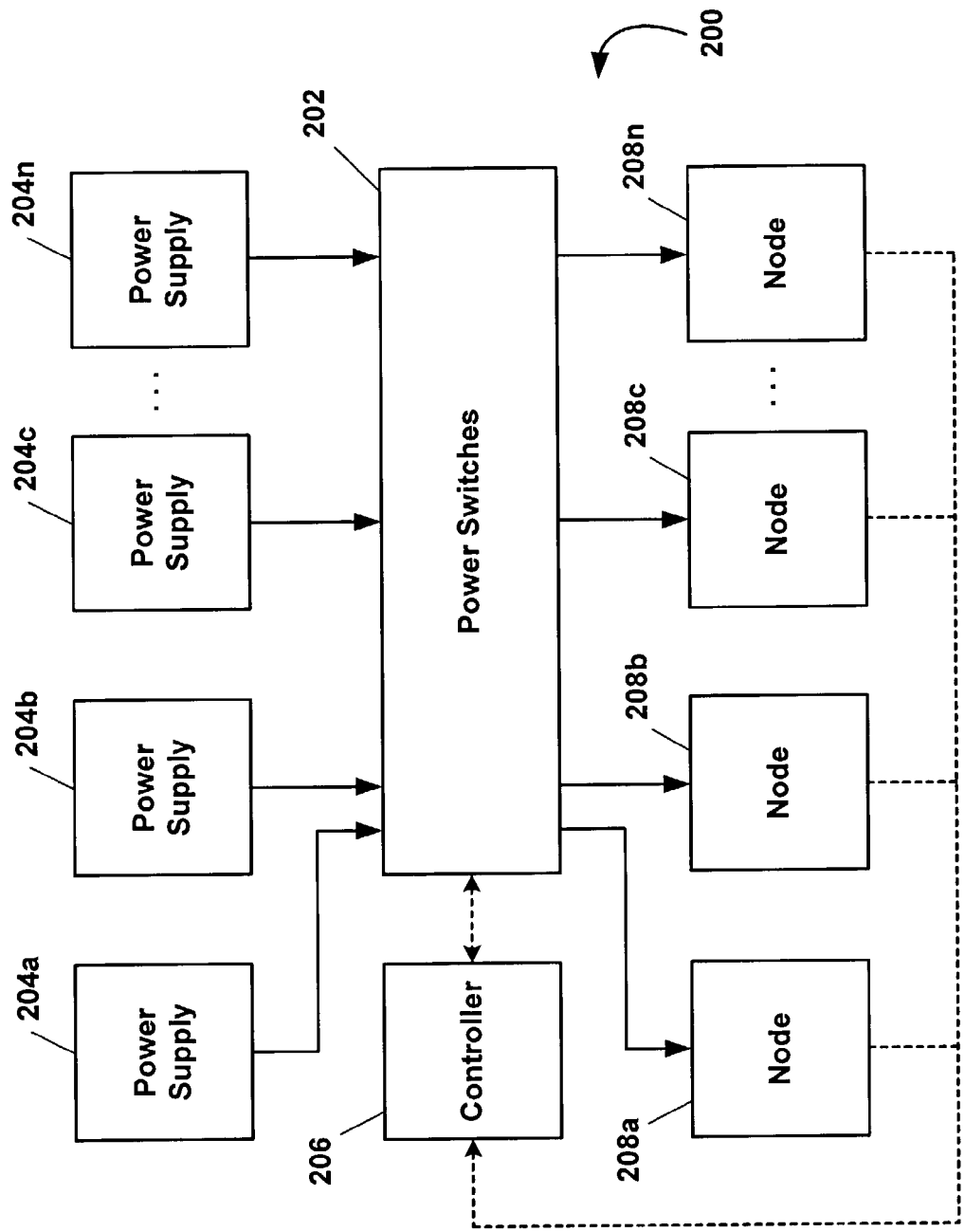
FIG. 2 is a simplified schematic block diagram illustrating a general exemplary embodiment of the present invention.

Referring to FIG. 2, a hot-pluggable node power distribution system is illustrated, according to an exemplary embodiment of the invention. The power distribution system is generally represented by the numeral 200 and comprises power switches 202, a plurality of power supplies 204, a controller 206, and a plurality of hot-pluggable nodes 208. It is contemplated and within the scope of the present invention that greater or few numbers of power supplies and/or nodes are equally applicable to the advantages, features and objects of the present invention. The controller 206 controls the power switches 202. The power switches 202 couple the plurality of power supplies 204 to the nodes 208. The controller 206 also detects when a new node is added and controls the power switches 202 as more fully described hereinafter.

Figure 3:
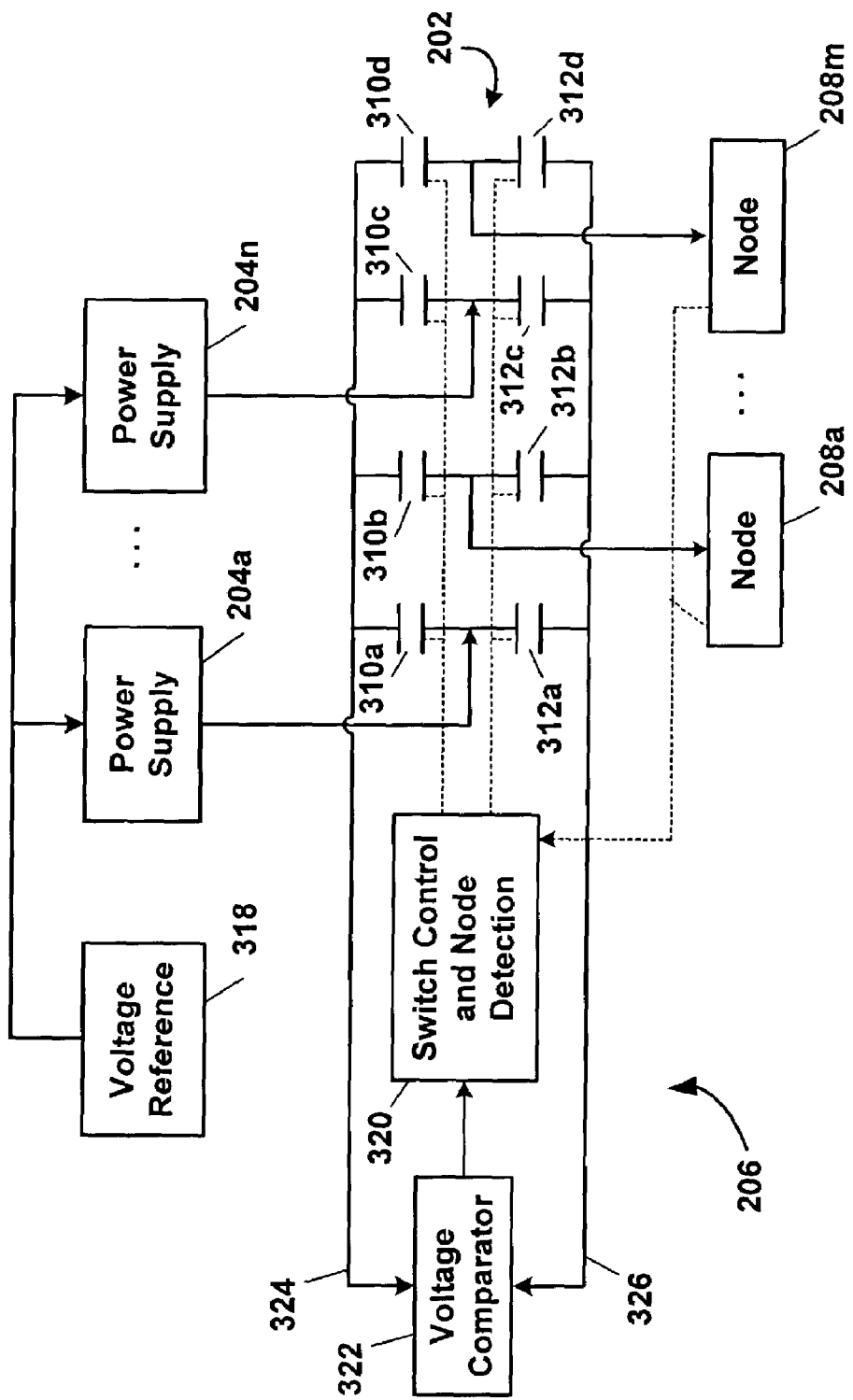
FIGS. 3 and 3A are schematic block diagrams of specific implementations of the embodiment illustrated in FIG. 2.

Referring now to FIG. 3, depicted is a more detailed schematic block diagram of an implementation of the embodiment of FIG. 2. The power switches 202 comprise a first plurality of switches 310 coupled to a main power bus 324, and a second plurality of switches 312 coupled to an isolated power bus 326. Normally, all of the plurality of power supplies 204 and all of the operational nodes 208 are coupled to the main power bus 324, e.g., the first plurality of switches 310 are closed and the second plurality of switches 312 are open.

Each of the plurality of power supplies 204 may be sized as follows: where N is the number of identical nodes, and P+R are the number of power supplies, R being the number of redundant power supplies. W is the power in watts available from one of the power supplies. The power required by any one of the nodes=P/N*W watts. As long as P/N≦1, a power supply may be isolated from the others and used to power a newly plugged in node. As long as the number of nodes is greater than or equal to the number of power supplies, the aforementioned relationship is always achieved. In the case that there are more power supplies than nodes, the same technique may be used to isolate the required number of power supplies to power the hot-plugged node. The associated controls and switches required will, however, increase in complexity.

The controller 206 may comprise switch control and node detection logic 320 and a voltage comparator 322. The switch control and node detection logic 320 controls the first plurality of switches 310 and the second plurality of switches 312 such that before one of the first plurality of switches 310 opens, a corresponding one of the second plurality of switches 312 closes, e.g., make-before-break. This enables "bumpless" transfer of power between the main power bus 324 and the isolated power bus 326. The plurality of switches 310, 312 may be power transistors, e.g., power field effect transistors (FETs) and bipolar junction transistors (BJTs), relay contacts, or any type of power transfer device know to one skilled in the art of electronic circuits.

The switch control and node detection logic 320 also detects the presence of each of the plurality of nodes 208. When insertion of a new hot-pluggable node 208 is detected, the switch control and node detection logic 320 will connect the newly inserted node 208 to the isolated power bus 326. The voltage comparator 322 compares the voltages of each of the buses 324 and 326, and when there is substantially no voltage difference between them, then both of the buses 324 and 326 are at voltage "equilibrium," e.g., no voltage transients or voltage dips are present on the isolated power bus 326 compared with the steady state voltage of the main power bus 324. The comparator 322 indicates this condition to the switch control and node detection logic 320 which then couples the newly connected node 208 to the main power bus 324 and de-couples it from the isolated power bus 326. The power supply 204 used to power the isolated power bus 326 may also be re-coupled to the main power bus 324 until another newly inserted node 208 is detected, then the aforementioned power-up cycle begins again.

An unoccupied node position (no node 208 present) may have power totally removed by opening both of the respective ones of the first and second plurality of switches connected thereto. Also, when a node 208 is to be removed, the respective ones of the first and second plurality of switches connected thereto may both be opened before the node is physically removed.

A voltage reference 318 may be used by all of the plurality of power supplies 204 for maintaining uniformity of voltage output from each of the power supplies 204, or other means well known to those skilled in the art of power supplies may be used to ensure even load distribution between each of the plurality of power supplies 204.

Figure 3A:
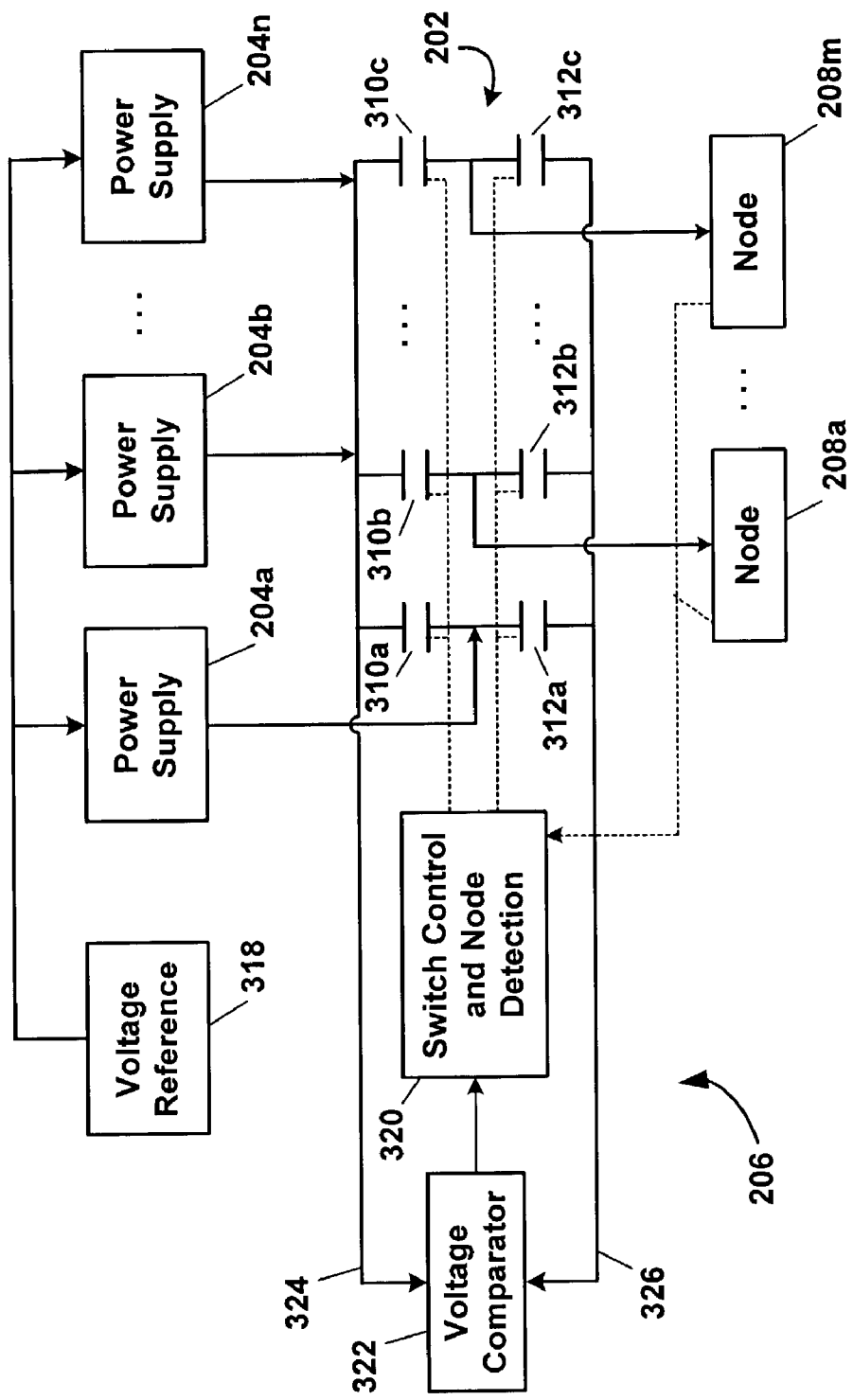

Referring to FIG. 3A, depicted is a more detailed schematic block diagram of an alternate implementation of the embodiment of FIG. 2. This is a simplified circuit having one power supply 204a capable of being coupled between the main power bus 324 and the isolated power bus 326. The remaining power supplies 204b–204n are coupled only to the main power bus 324. The nodes 208 and respective switches 310, 312 continue to operate as described above for the circuit illustrated in FIG. 3. Requiring only one power supply 204a to switch between the main power bus 324 and the isolated power bus 326 eliminates a number of the switches 310 and 312. This reduction in the number of switches required and associated connections thereto saves manufacturing costs and product complexity of the information handling system while retaining the features and advantages of the invention described and claimed herein.

Figure 4:
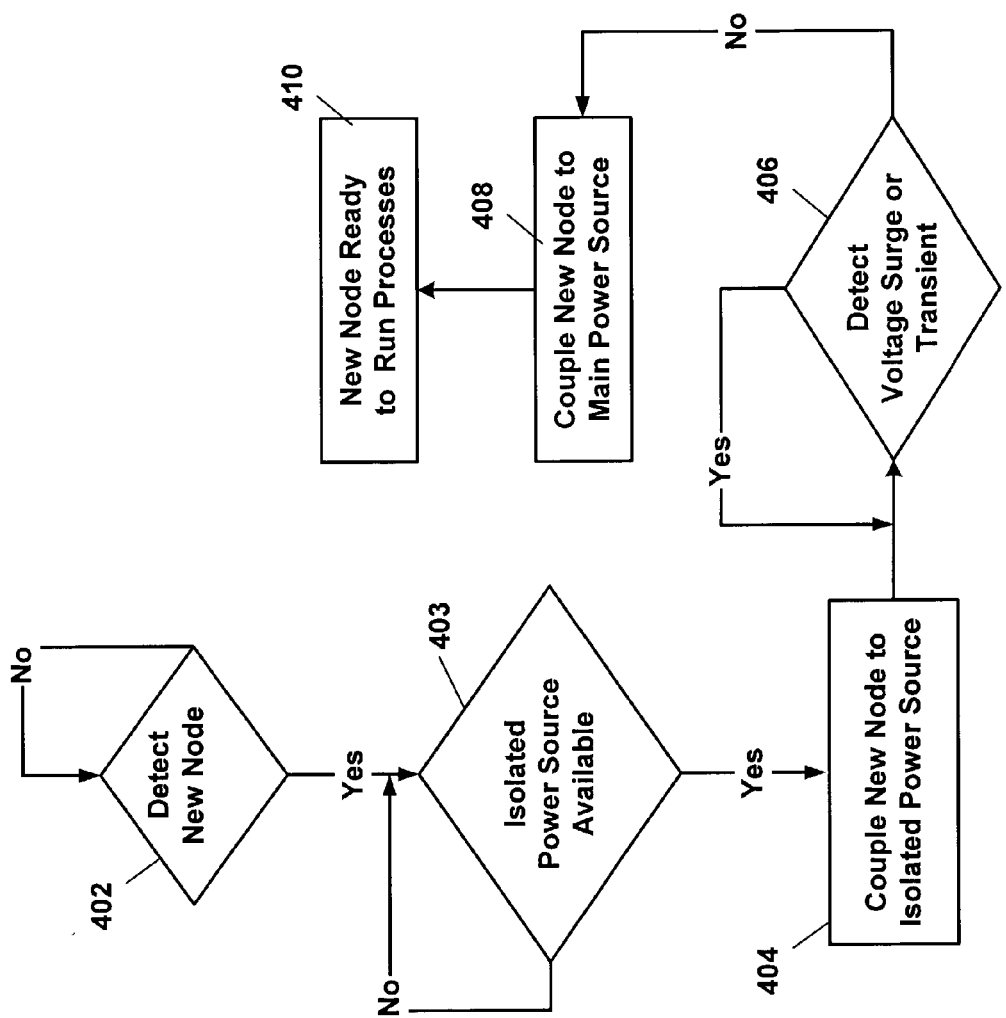
FIG. 4 is a schematic flow diagram of the operation of adding a new node, according to an exemplary embodiment of the invention.

Referring to FIG. 4, depicted is a schematic flow diagram of the operation of adding a new node, according to an exemplary embodiment of the invention. The hot-pluggable node slots (not illustrated) are monitored in step 402 and when a new node is detected, a power source is isolated. Step 403 determines when the isolated power source is available. Then in step 404 the new node is coupled to this available isolated power source. The new node and isolated power source are monitored in step 406 for voltage sag or transients referenced to a main power source. When substantially no voltage sag or transients are detected, then in step 408 the new node is coupled to the main power source and de-coupled from the isolated power source which may be coupled back to the main power source to again function as a redundant power source. In step 410, the basic input-output system (BIOS) and/or operating system (OS) is notified that the new node is ready to run processes.

Figure 5:
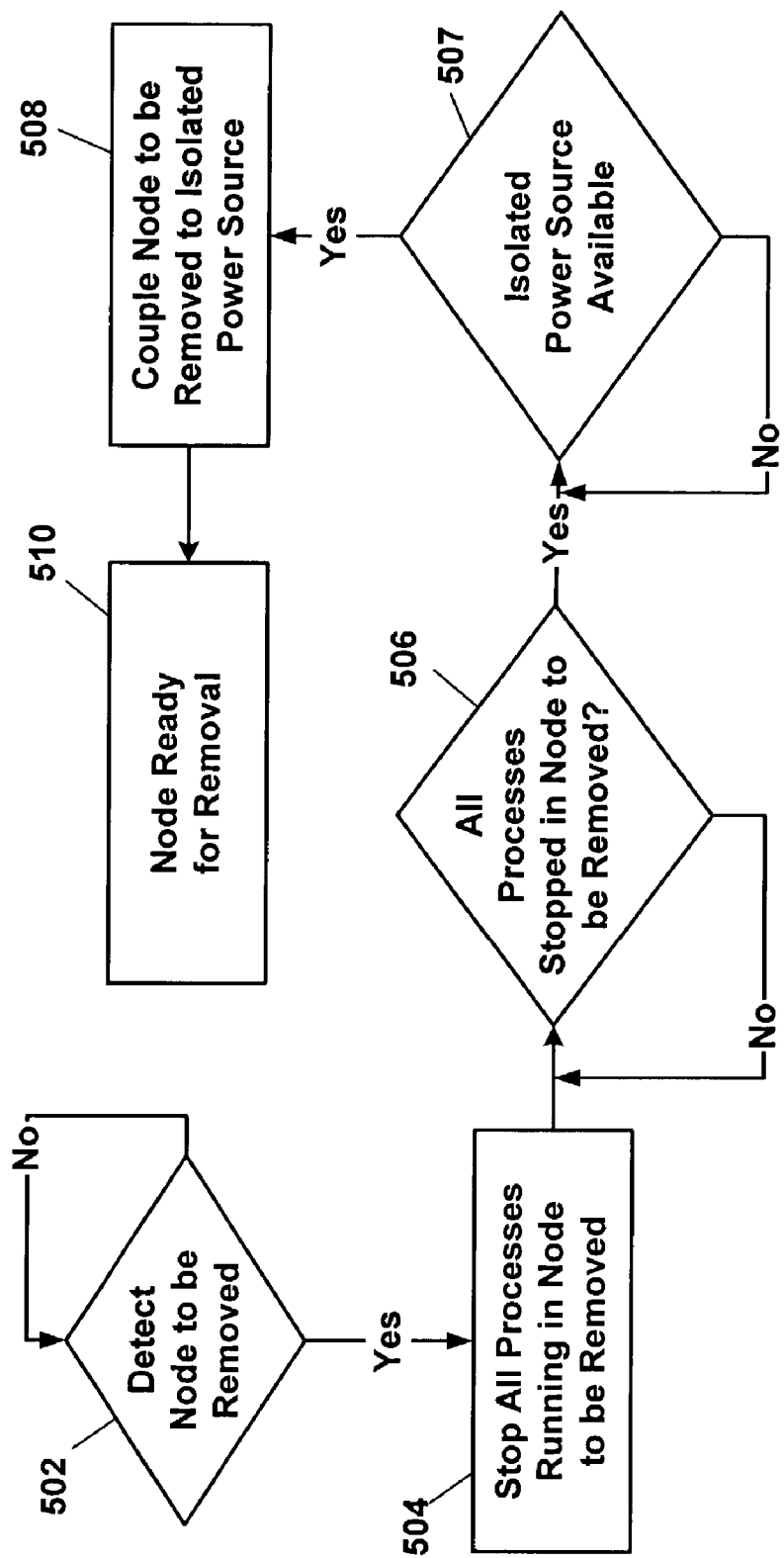
FIG. 5 is a schematic flow diagram of the operation of removing an existing node, according to another exemplary embodiment of the invention.

Referring to FIG. 5, depicted is a schematic flow diagram of the operation of removing an existing node, according to another exemplary embodiment of the invention. The hot-pluggable node slots (not illustrated) are monitored in step 502 to detect when an existing node is to be removed. In step 504, the basic input-output system (BIOS) and/or operating system (OS) is notified to stop all processes running in that node to be removed. Step 506 determines when all processes have stopped in the node to be removed. Step 507 determines when an isolated power source is available. Then the node to be removed is coupled to this isolated power source in step 508. In step 510, the node to be removed may now be safely removed from the information handling system without disturbing the remaining operational nodes. After the node has been removed in step 510, the isolated power source may be coupled back to the main power source to again function as a redundant power source.

The invention, therefore, is well adapted to carry out the objects and to attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alteration, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. An information handling system, comprising:
    a plurality of power supplies;
    at least one hot-pluggable node;
    a plurality of power switches for coupling the plurality of power supplies to the at least one hot-pluggable node; and
    control logic for controlling the plurality of power switches and detecting the at least one hot-pluggable node, wherein
        when a one of the at least one hot-pluggable node is detected by the control logic,
        at least one of the plurality of power supplies is isolated from other ones of the plurality of power supplies, and
        the isolated at least one of the plurality of power supplies is coupled to the detected one of the at least one hot-pluggable node,
        whereby when power to the one of the at least one hot-pluggable node has stabilized, the one of the at least one hot-pluggable node is coupled to the other ones of the plurality of power supplies.

2. The information handling system according to claim 1, wherein the isolated one of the plurality of power supplies is coupled back to the other ones of the plurality of power supplies when the power to the one of the at least one hot-pluggable node has stabilized.

3. The information handling system according to claim 1, wherein the plurality of power supplies are coupled to a main power bus and the isolated one of the plurality of power supplies is coupled to an isolated power bus, whereby the one of the at least one hot-pluggable node is coupled to the isolated power bus when detected and then coupled to the main power bus when the power thereto has stabilized.

4. The information handling system according to claim 3, wherein when voltage of the main power bus and voltage of the isolated power bus are substantially the same, the control logic couples the one of the at least one hot-pluggable node from the isolated power bus to the main power bus.

5. The information handling system according to claim 4, wherein the isolated one of the plurality of power supplies is coupled to the main power bus after the at least one hot-pluggable node is coupled to the main power bus.

6. The information handling system according to claim 3, wherein the control logic couples the one of the at least one hot-pluggable node from the isolated power bus to the main power bus when there are substantially no transient voltages detected on the isolated power bus.

7. The information handling system according to claim 6, wherein the isolated one of the plurality of power supplies is coupled to the main power bus after the one of the at least one hot-pluggable node is coupled to the main power bus.

8. The information handling system according to claim 1, wherein the plurality of power switches comprise a plurality of power transistors.

9. The information handling system according to claim 8, wherein the plurality of power transistors are bipolar transistors.

10. The information handling system according to claim 8, wherein the plurality of power transistors are field effect transistors.

11. The information handling system according to claim 1, wherein the plurality of power switches are make-before-break.

12. The information handling system according to claim 1, further comprising a voltage reference for establishing a desired voltage for each of the plurality of power supplies.

13. The information handling system according to claim 1, wherein the at least one hot-pluggable node is selected from the group consisting of a processor, a memory, a disk controller, network interface controllers, input-output interface, a disk storage array, a plurality of central processing units, and cache memory.

14. An information handling system, comprising:
    a plurality of power supplies;
    at least one operating hot-pluggable node;
    a plurality of power switches for coupling the plurality of power supplies to the at least one operating hot-pluggable node; and
    control logic for controlling the plurality of power switches and detecting removal of the at least one operating hot-pluggable node, wherein
        when a one of the at least one operating hot-pluggable node is to be removed,
        all processes running in the at least one operating hot-pluggable node to be removed are stopped,
        at least one of the plurality of power supplies is isolated from other ones of the plurality of power supplies, and
        the isolated at least one of the plurality of power supplies is coupled to the one of the at least one hot-pluggable node to be removed.

15. The information handling system according to claim 14, further comprising the isolated one of the plurality of power supplies being coupled to the other ones of the plurality of power supplies after the at least one hot-pluggable node is removed.

16. The information handling system according to claim 14, further comprising the isolated one of the plurality of power supplies being coupled to the other ones of the plurality of power supplies after the at least one hot-pluggable node is removed and there are substantially no transient voltages detected on the isolated one of the plurality of power supplies.

17. A method of adding a hot-pluggable node into an information handling system without disturbing existing operational nodes, said method comprising the steps of:
    providing a plurality of power supplies;
    adding a hot-pluggable node into an information handling system;
    detecting the added hot-pluggable node;
    isolating a one of the plurality of power supplies from other ones of the plurality of power supplies;

coupling the added hot-pluggable node to the isolated one of the plurality of power supplies;
determining when power to the added hot-pluggable node has stabilized; and
coupling the added hot-pluggable node to the other ones of the plurality of power supplies after the power has stabilized.

18. The method according to claim 17, further comprising the step of coupling the isolated one of the plurality of power supplies back to the other ones of the plurality of power supplies after the power has stabilized.

19. The method according to claim 17, wherein the steps of isolating and coupling are performed with make-before-break power switches.

20. The method according to claim 17, wherein the step of determining when power to the added hot-pluggable node has stabilized comprises the step of comparing a voltage of the isolated one of the plurality of powers supplies with a voltage of the other ones of the plurality of power supplies.

21. A method of removing a hot-pluggable node in an information handling system without disturbing existing operational nodes, said method comprising the steps of:
providing a plurality of power supplies;
detecting when a one of at least one operating hot-pluggable node is to be removed;
stopping all processes running in the detected one to be removed of the at least one operating hot-pluggable node;
isolating a one of the plurality of power supplies from other ones of the plurality of power supplies; and
coupling the detected one to be removed of the at least one operating hot-pluggable node to the isolated one of the plurality of power supplies.

22. The method according to claim 21, further comprising the steps of:
determining when power has stabilized from the isolated one of the plurality of power supplies after the one of the at least one operating hot-pluggable node has been removed; and
coupling the isolated one of the plurality of power supplies back to the other ones of the plurality of power supplies after determining that the power has stabilized.

23. The method according to claim 21, wherein the steps of isolating and coupling are performed with make-before-break power switches.

24. The method according to claim 22, wherein the step of determining when power has stabilized comprises the step of comparing a voltage of the isolated one of the plurality of powers supplies with a voltage of the other ones of the plurality of powers supplies.

* * * * *